United States Patent
Simon

(10) Patent No.: US 9,140,406 B2
(45) Date of Patent: Sep. 22, 2015

(54) SUPPORT FOR VARIABLY POSITIONING A HOLDER PLATFORM FOR BOOKS OR ELECTRIC DEVICES

(71) Applicant: David F. Simon, Lakeland, FL (US)

(72) Inventor: David F. Simon, Lakeland, FL (US)

( * ) Notice: Subject to any disclaimer, the term of this patent is extended or adjusted under 35 U.S.C. 154(b) by 0 days.

(21) Appl. No.: 13/934,710

(22) Filed: Jul. 3, 2013

(65) Prior Publication Data

US 2014/0191103 A1 Jul. 10, 2014

Related U.S. Application Data

(60) Provisional application No. 61/749,445, filed on Jan. 7, 2013.

(51) Int. Cl.
| | |
|---|---|
| A47B 97/04 | (2006.01) |
| F16M 13/02 | (2006.01) |
| A47B 23/02 | (2006.01) |
| F16M 11/10 | (2006.01) |
| F16M 11/20 | (2006.01) |
| F16M 11/24 | (2006.01) |

(52) U.S. Cl.
CPC .............. *F16M 13/022* (2013.01); *A47B 23/02* (2013.01); *F16M 11/105* (2013.01); *F16M 11/2014* (2013.01); *F16M 11/2021* (2013.01); *F16M 11/24* (2013.01); *A47B 2200/0085* (2013.01); *F16M 2200/022* (2013.01)

(58) Field of Classification Search
CPC . F16M 11/28; F16M 11/2092; F16M 11/105; F16M 11/24; F16M 11/2064; F16M 2200/063; F16M 2200/044; F16M 2200/065; F16M 2200/06; F16B 2/065; A47B 23/02; A47B 23/04

USPC ........... 248/276.1, 274.1, 558, 689, 458, 462, 248/441.1, 451, 122.1, 123.11, 220.21, 248/220.22, 280.11, 292.11, 447, 447.1, 248/447.2, 454, 229.15, 229.25, 231.71, 248/292.12, 309.1, 316.1; 403/52, 53, 110, 403/113, 164

See application file for complete search history.

(56) References Cited

U.S. PATENT DOCUMENTS

| | | | | |
|---|---|---|---|---|
| 1,682,180 | A * | 8/1928 | Merrill | 248/462 |
| 4,687,167 | A * | 8/1987 | Skalka et al. | 248/126 |
| 5,624,096 | A * | 4/1997 | Haynes | 248/451 |
| 5,671,900 | A * | 9/1997 | Cutler | 248/451 |
| 5,709,365 | A * | 1/1998 | Howard | 248/454 |
| 5,772,174 | A * | 6/1998 | Hirsch et al. | 248/447.1 |
| 6,209,835 | B1 * | 4/2001 | Walrath et al. | 248/276.1 |
| 7,540,464 | B2 * | 6/2009 | Samari | 248/445 |
| 8,191,487 | B2 * | 6/2012 | Theesfeld et al. | 108/144.11 |
| 8,469,323 | B1 * | 6/2013 | Deros et al. | 248/278.1 |
| 2008/0073946 | A1 * | 3/2008 | Maione | 297/161 |
| 2008/0164395 | A1 * | 7/2008 | Chang et al. | 248/276.1 |
| 2014/0091193 | A1 * | 4/2014 | Simon | 248/451 |

* cited by examiner

*Primary Examiner* — Todd M Epps
(74) *Attorney, Agent, or Firm* — John R. Benefiel

(57) ABSTRACT

A support for a variably positioning a platform which is adapted to hold a book or electronic display for convenient viewing, the support having a pair of swing arms pivotally connected together end to end and to an upright standard, with the platform connected to an outer end of one swing arm with a two orthogonal pivot connections to a platform mount and a pivot connection between the mount and platform. This creates five axes of independent pivoting movement of various components available to position the platform. A friction element for some of the pivot connections allows tightening of an adjustment screw to increase or decrease the friction to stabilize the platform in a selected position without tending to loosen the screw and the associated pivot connection.

5 Claims, 6 Drawing Sheets

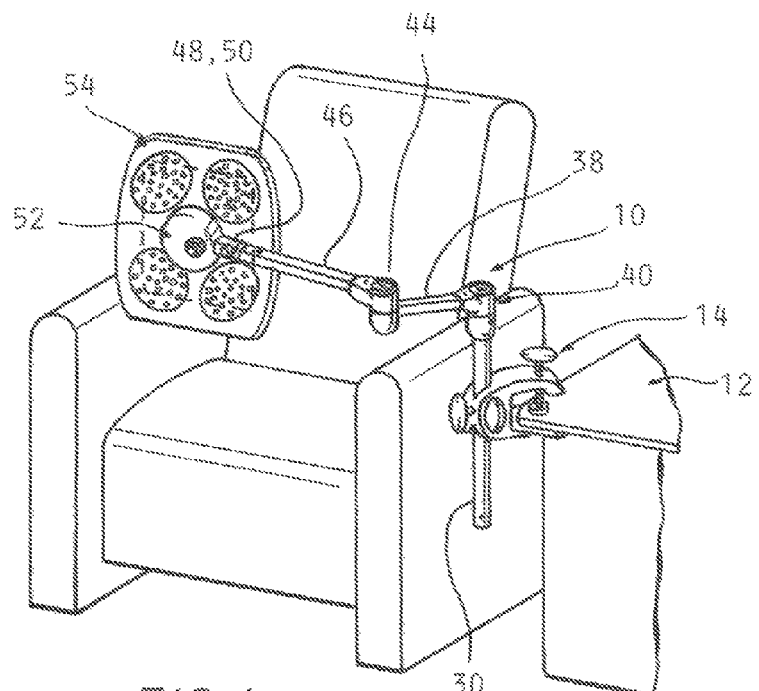
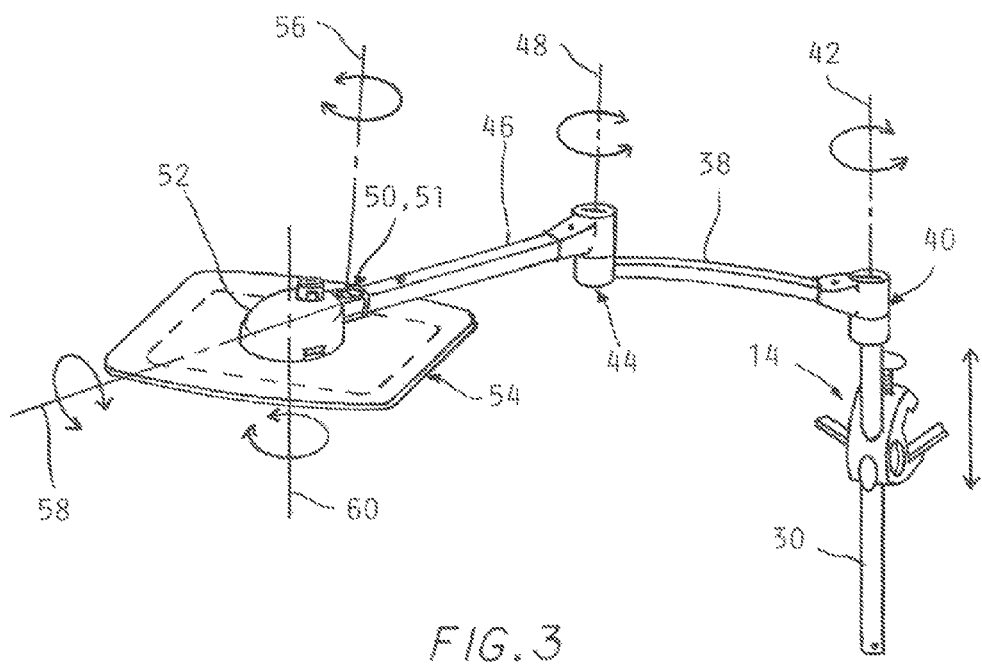

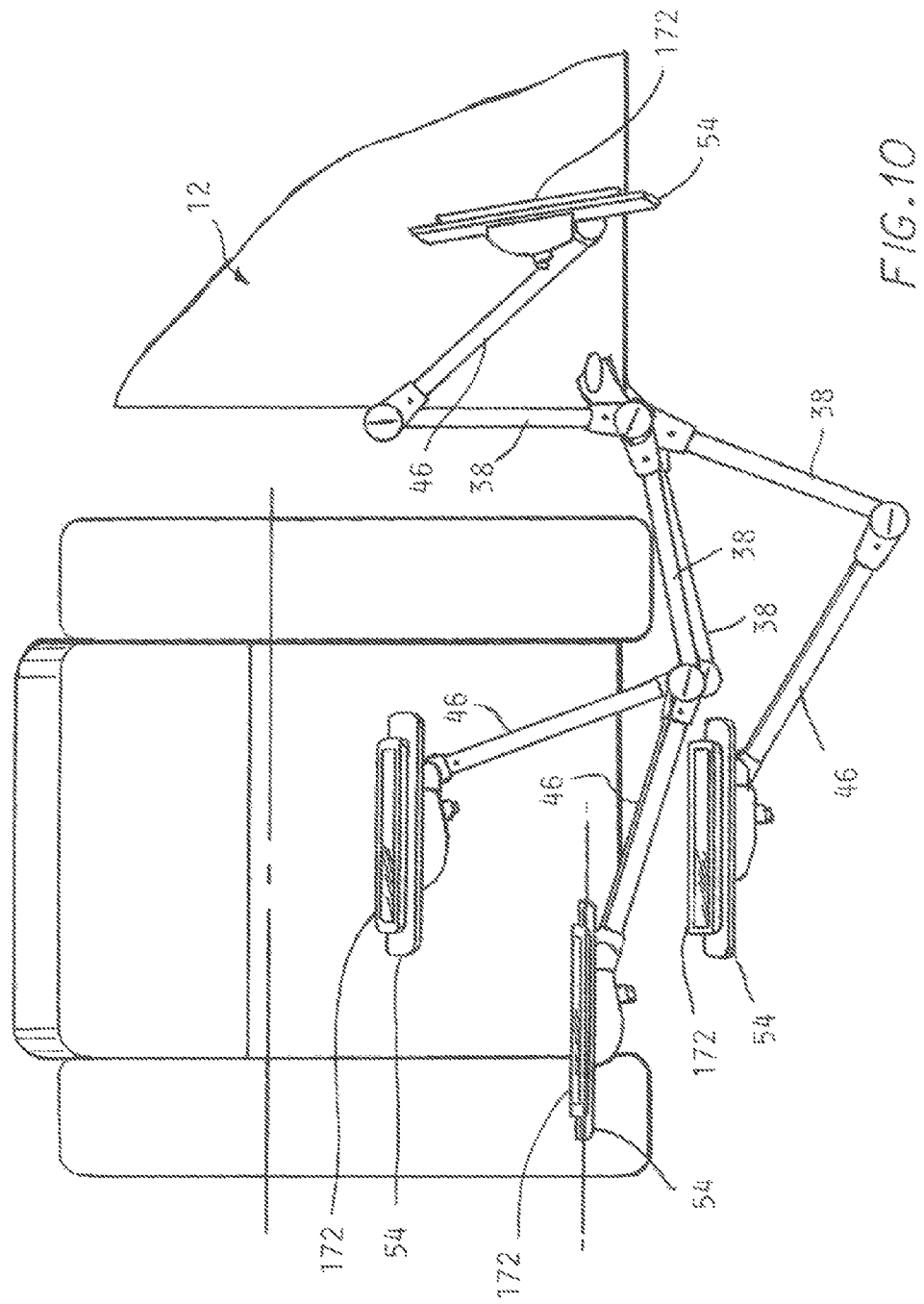

SUPPORT FOR VARIABLY POSITIONING A HOLDER PLATFORM FOR BOOKS OR ELECTRIC DEVICES

CROSS REFERENCE TO RELATED APPLICATIONS

This application claims the benefit of U.S. provisional application No. 61/749,445 filed on Jan. 7, 2013, and is a continuation in part of U.S. patent application Ser. No. 13/629,944 filed on Sep. 28, 2012.

BACKGROUND OF THE INVENTION

This invention involves supports for variably positionable platforms which are adapted to hold books or electronic displays for convenient viewing by a user.

U.S. Pat. No. 7,040,591 by the present inventor incorporated herein by reference describes and claims a swing arm support for books. The platform can be swung to various positions to hold a book so that the user can conveniently read the same while seated, lying in bed, etc.

An important consideration is how the swing arm assembly is held, and co-pending U.S. application Ser. No. 13/629,941 filed Sep. 28, 2012 describes a particular clamping attachment for an upright swing arm support for securing the same to end tables, etc. incorporated herein by reference.

Another important consideration is the ability to easily and precisely adjust the position of the platform so as to present a book or electronic devices perpendicular to the user's line of vision, and to securely maintain any adjusted position.

While the prior book holders have provided for an adjustable positioning of a platform, there are limitations in the adjustments possible and difficulties in quickly establishing a precise desired positioning of the supported article including being able to keep the book or electronic display perpendicular.

It is an object of the present invention to provide a book or electronic device holder which can easily and precisely establish a desired position of a platform which will be securely maintained once adjusted.

SUMMARY OF THE INVENTION

The above recited object of the present invention and other objects which will be understood upon a reading of the following specification and claims are achieved by mounting a generally planar platform to an upright support bar by two articulated swing arms, with five individual axes of rotation provided to enable positioning of the platform by rotation about one or more of these axes. The connection at each axis includes an adjustable friction feature which controls the level of frictional resistance necessary to be overcome to carry out a pivoting adjustment about the axis to maintain any adjusted rotation about that axis. The pivoting about each axis is designed to be independently carried out with no effect on the position about any of the other axes, to thereby simplify the positioning and orientating of the platform necessary to achieve a desired platform position.

The first pivot axis extends vertically and is at an end of a first swing arm connected to a vertical support for the assembly, as shown in the co-pending application referenced above. The second pivot axis is also vertical and is located at the other end of the first swing arm at one end of a second swing arm.

The third pivot axis is also vertical and located at the other end of the second swing arm forming a connection to a pivot shaft projecting into frictional mount for the platform. The pivot shaft is rotatable about a fourth axis orthogonal to the first three axes.

The platform is pivoted about a fifth axis on the frictional mount about an axis orthogonal to the fourth axis and parallel to the first three axes.

Each of the pivot connections of the first three pivot axes have an adjustable frictional pressure arrangement retarding pivoting about the respective axis including a pressure piece which is pressed against one of the rotating elements of the pivot connection by the head of a threaded pin advanced into a nut held stationary in the other rotary element. The head of the pin is not rotated relative the pressure piece when the two rotary elements are pivoted with respect to each other such that the pressure adjustment does not loosen up despite many repeated pivoting motions between the two elements.

The five axes allow independent position adjustments about each axis in a capability of quickly and precisely positioning the platform at various orientations and locations, which will remain securely in a selected position. In particular, it allows moving the platform in two directions while it remains parallel to a given plane, i.e. flat to a user's viewing friction.

The combination allows three degrees of movement to be produced by separate rotations about respective axes, such that quicker and more precise adjustments are enabled, since the separate adjustments do not affect each other which would otherwise require constant readjustments.

DESCRIPTION OF THE DRAWINGS

FIG. 1 is a pictorial view of a variably positionable holder platform mounted on a table alongside a chair in which a user could be seated.

FIG. 3 is a pictorial view of the platform moved to a horizontal position with indications of the several axes of pivoting of the various components of the support to carry out an adjustment of the position and orientation of the platform.

FIG. 10 is a plan view of the support shown in FIG. 1 depicting various adjusted positions of the platform shown in FIG. 1 relative a chair and table to which the support is clamped.

DETAIL DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 2:
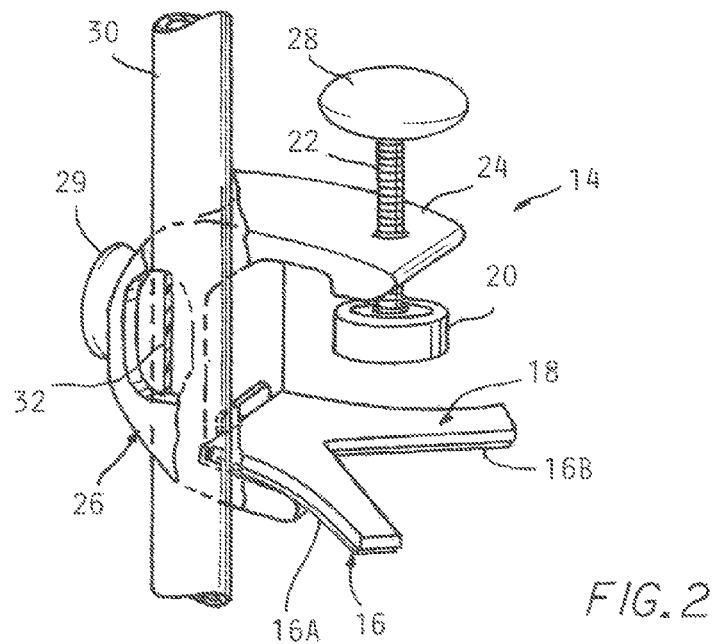
FIG. 2 is a fragmentary enlarged view in partial section of a vertical adjustment clamp incorporated in the support shown in FIG. 1.
Figure 6:
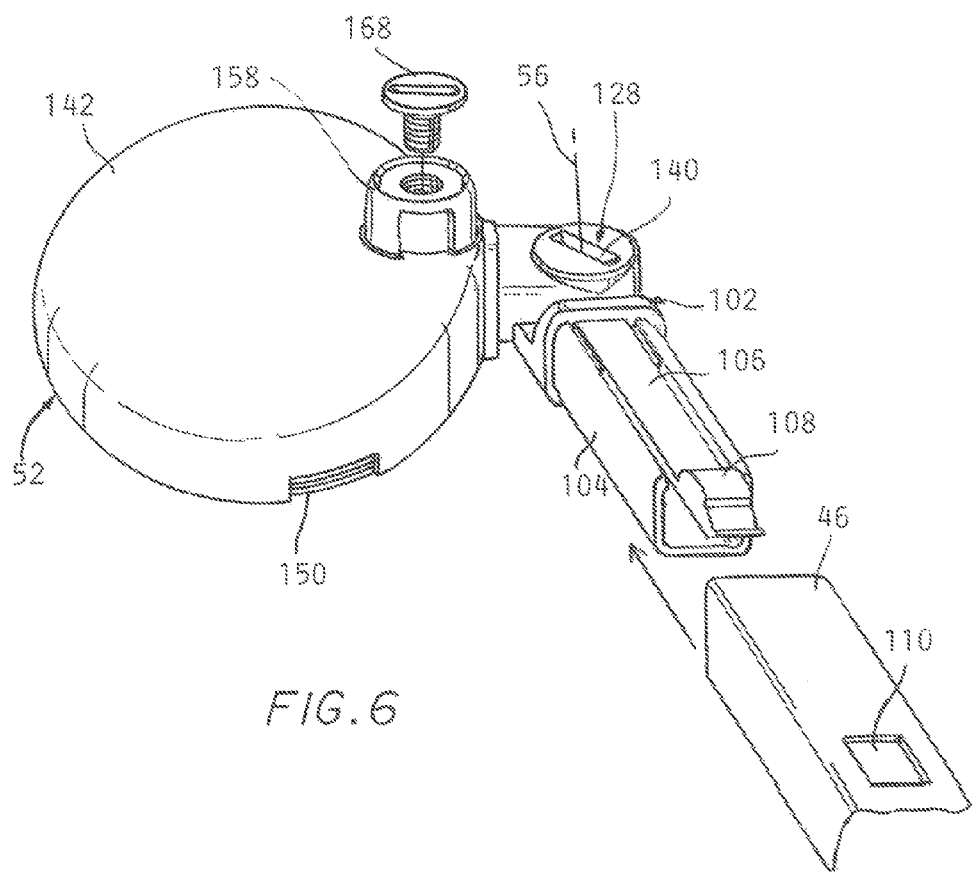
FIG. 6 is a partially exploded pictorial view of a platform friction mount shown in FIG. 3 and connected to an outer end of a second swing arm.
Figure 4:
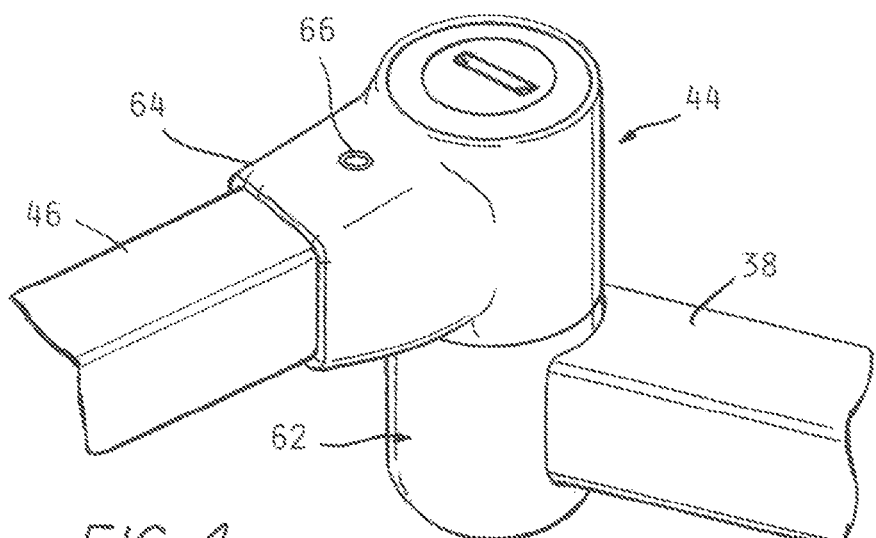
FIG. 4 is an enlarged pictorial view of the pivot joint between two swing arms included in the support.
Figure 5:
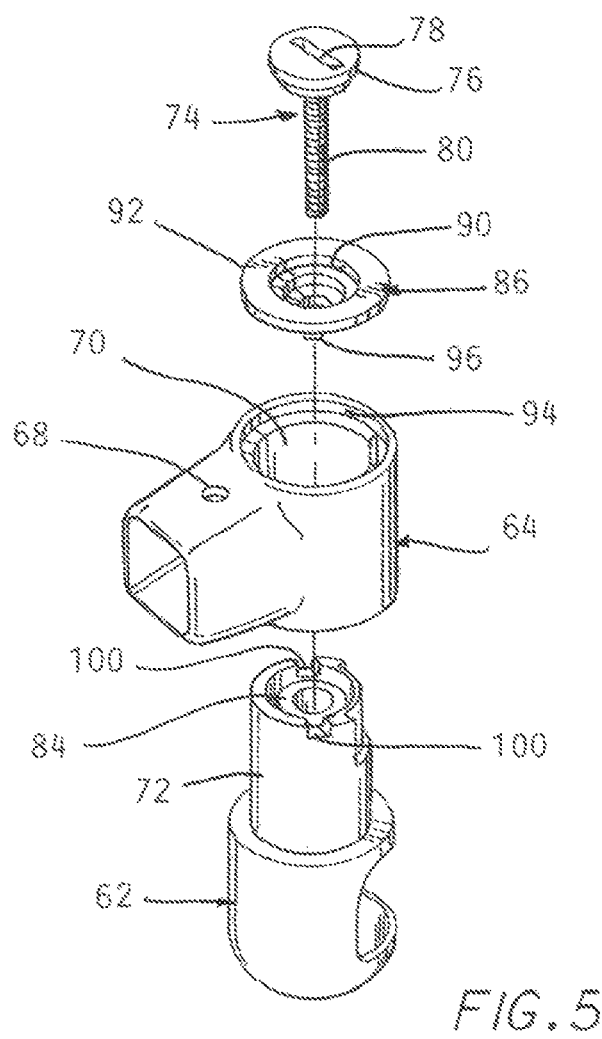
FIG. 5 is an exploded pictorial view of components of the pivot joint shown in FIG. 4.
Figure 5A:
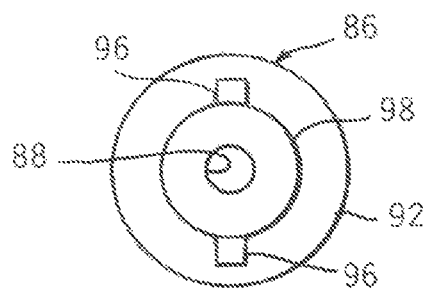
FIG. 5A is a bottom view of a friction pressure element component shown in FIG. 5.
Figure 5C:
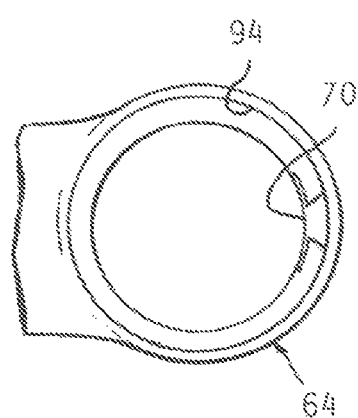
FIG. 5C is a top view of another end fitting mating with the one end fitting shown in FIG. 5 and FIG. 5B.
Figure 5B:
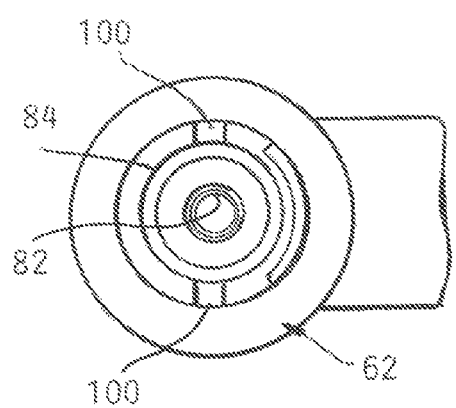
FIG. 5B is a top view of one end fitting component shown in FIG. 5.

Referring to the drawings and particularly FIGS. 1 and 2, a support 10 according to the invention is shown clamped to the top of an end table 12 by a clamping arrangement 14. Other versions of the clamping arrangement 14 are described in detail in co-pending U.S. patent application Ser. No. 13/629,941 filed on Sep. 28, 2012 and includes an angled metal corner piece 16 with a plastic cover 18 installed thereon.

The angled corner piece 16 fits to one corner of the end table 12. As described in that application, slight overhangs of the table can be gripped securely because of the two legs 16A, 16B extending at right angles to each other. An upper clamping member 20 has a threaded stem 22 received in a threaded hole in an upper leg 24 of a C frame 26 so as to be able to be advanced up or down by rotating the handle 28 to clamp to the table overhang edges.

An upright standard 30 which is preferably hollow and of a rounded corner square shape in section, passes through a correspondingly shaped through passage in the C frame 26. A plastic liner piece 32 is installed in the C frame opening to provide smooth sliding on the standard 30.

A threaded handle 29 on the back of the C frame 26 can be turned to engage the plastic liner piece 32 to hold the standard 30 in any adjusted vertical position.

A first coated metal inner swing arm 38 has a pivotal connection 40 at an inside end to the upper end of the standard 30, allowing it to pivot around a first axis 42 which is generally vertical (FIG. 3).

An outer end of the inner swing arm 38 has a pivot connection 44 to an inner end of a second or outer swing arm 46, allowing swinging of both of the swing arms 38 and 46, pivoting about a second vertical axis 48, also as indicated in FIG. 3.

The outer end of the second swing arm 46 has two pivotal connections 50, 51 connecting it to a platform holder 52 for a generally planar platform 54. Connections 50, 51 allow pivoting motion about both a generally vertical third axis 56 and a generally horizontal fourth axis 58.

Platform pivotal frictional mount Platform holder 52 is itself mounted to the platform 54 which allows pivoting motion about a fifth axis 60, often positioned in generally horizontal direction, although this could also be generally vertical as seen in FIG. 3 or somewhere in between depending on the adjusted orientation of the platform 54.

Referring to FIGS. 4, 5 and 5A-5C, details of the pivotal connection 44 between swing arms 38, 46 are shown.

This includes an end fitting 62 which may be made of a high strength molded plastic fixedly connected to the outside end of swing arm 38, as with a roll pin (not shown) into the bottom thereof, and a molded plastic end fitting 64 fixedly connected to the inner end of swing arm 46, as with a roll pin 66 received in a hole 68.

The fitting 64 is formed with a bore 70 slidably receiving a post feature 72 and fitting 62 to establish a pivotal relationship therebetween.

An adjustable friction snubbing arrangement is incorporated in the pivotal connection, which includes a screw 74 having a disc head 76 which has a cross slot 78 formed therein sized to receive common coins to enable the threaded stem portion 80 to be conveniently threaded into a threaded bore 82 (FIG. 5B) at the bottom of a tube 84 molded into the post 72 of the end fitting 62.

An annular friction element 86 which may be molded from a suitable high strength plastic such as nylon, receives the screw 74 with the head 76 received in a counterbore 90. An outer rim 92 in turn is received in a counterbore 94 of the bore 74.

A pair of locking key features 96 project from a reduced diameter projection 98 of the element 86 molded beneath the rim 92 and fit into notches 100 in the top of the outer diameter of the post feature 72.

With the rim 92 seated in the counterbore 94, the threaded stem is threaded into threaded bore 82 can be turned as with a coin (not shown), which draws the undersurface of the rim 92 into tighter frictional engagement with the counter bore 94.

As the friction element is fixed to the post 72 by the key feature 96 received in notches 100, the friction between the rim 92 and counter bore 94 inhibits relative rotation between end fittings 62 and 64 stabilizing any adjusted positions of the swing arm 38 and 46, while still allowing relative movement to position the platform 54 in any desired location and orientation.

Since the screw head 76 and the counterbore 94 cannot relatively rotate, repeated pivoting of the two swing arms 38, 46 does not tend to loosen the screw 74, so that the friction pressure will remain at any level, and this eliminates any tendency to loosen the joint that would otherwise occur.

Referring to FIGS. 6-9, the details of the pivotal connections 50, 51 are shown.

Pivotal connection 50 includes an end fitting 102 attached to the outer end of the swing arm 46 by an inner slide 104 inserted into the swing arm 46, with a resilient snap retainer feature 106 formed with a raised catch 108, which snaps into a square hole 110 in one wall of the swing arm 46 when fully inserted therein. This holds these parts together.

Figure 9:
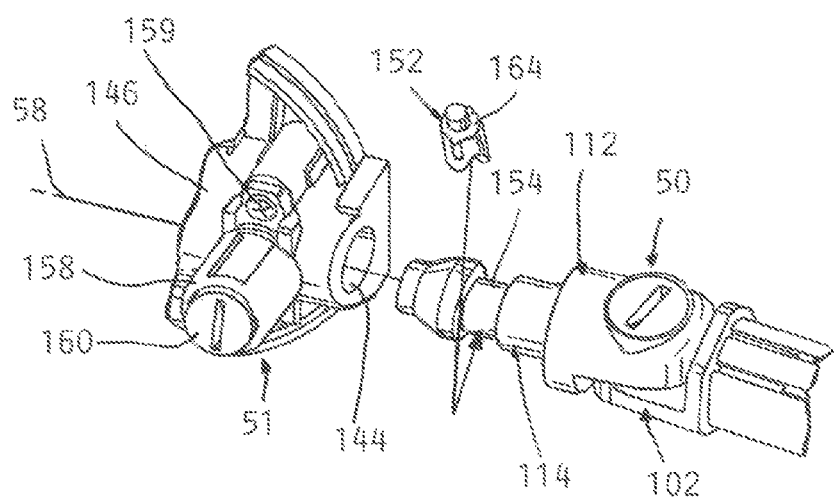
FIG. 9 is a partially exploded pictorial view of other components included in the pivot joints and frictional elements shown in FIG. 8.

"A second fitting 112 is affixed to a shaft 114 (FIG. 9). Fitting 112 has a bore 116 formed therein with a counterbore forming a shoulder 118 (FIG. 8), with a friction element 119 received therein having a shoulder 120 engaging the shoulder 118, similar to joints 40, 44. Key features 122 engage slots 124 in a raised rim 126 on fitting 102 on 1."

An adjusting screw 128 has a head 130 received in the friction element 118, with a threaded portion 132 passing through a hole 134 therein and threaded into a nut 136 captured in a hex seat 138 to be able to be tightened using a coin (not shown) in a slot 140 as with the other pivot connections described above to increase the friction inhibiting pivoting motion of the arm 46.

Figure 7:
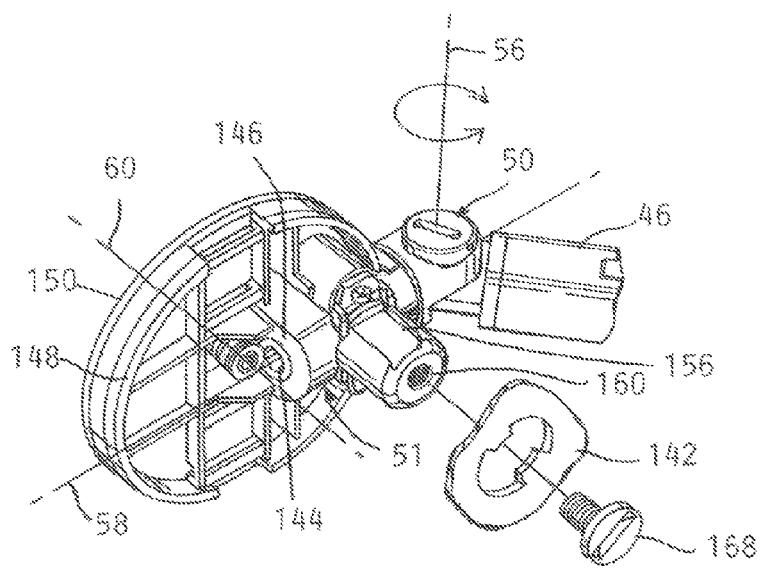
FIG. 7 is a partially exploded pictorial view of the platform friction mount shown in FIG. 6.
Figure 8:
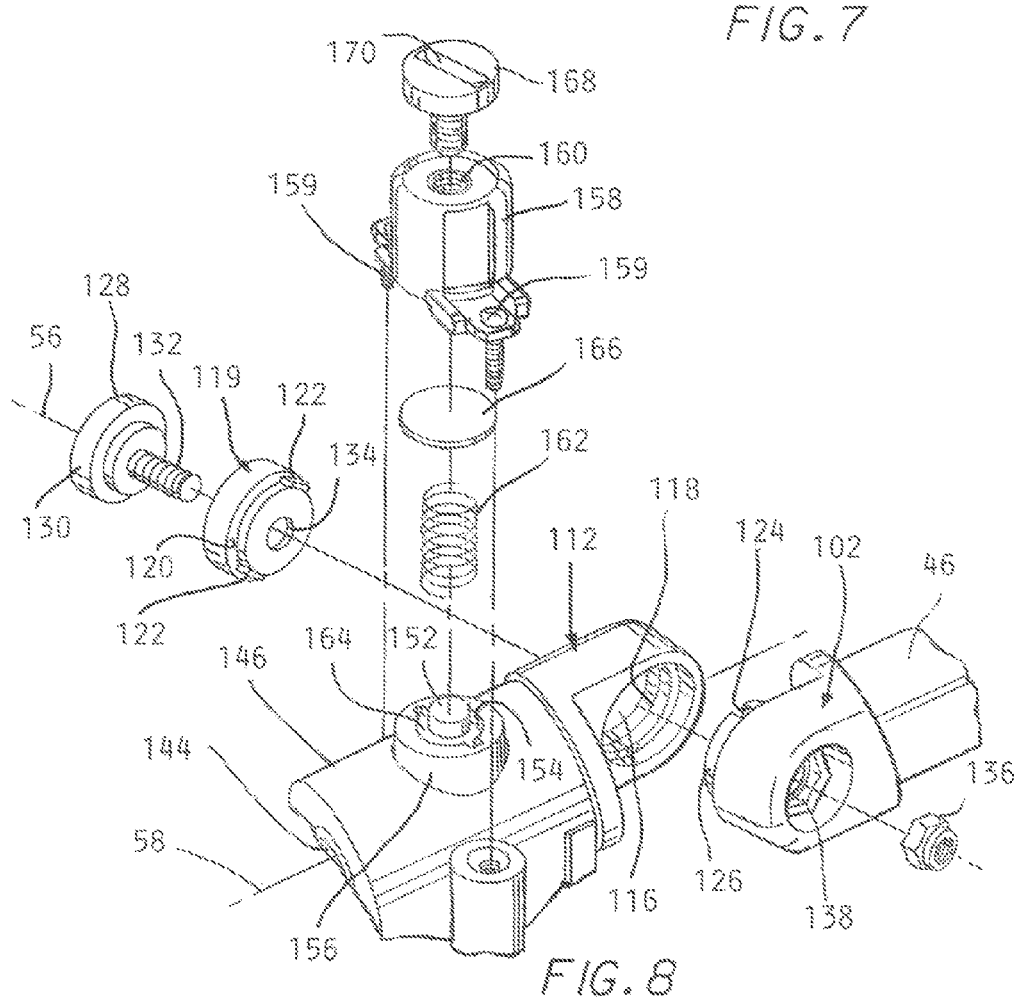
FIG. 8 is an exploded view of the platform mount and the pivot connection between the outer end defining fourth and fifth axes of rotation of the support components and the corresponding friction pressure elements, elements of the pivot connection rotted by 90°.

Pivotal connection 51, creates adjustment motion about axis 58 which extends radially across the platform holder 52. Platform 54 is mounted to the front of the platform holder 52 as seen in FIGS. 7 and 9. A, cover 142 normally in place, is shown removed in FIGS. 7-9.

The vertical axis 56 is defined by the axis of the bore 116, extending across the back and center of the platform holder 52 and platform 54, closely spaced therefrom.

The rotation of the shaft 114 in the bore 144 defines the rotational motion about the fourth axis 58.

The shaft 114 is received in a bore 144 formed in a barrel 146 molded into a bracket frame 148 holding a friction pad 150 included in the platform holder 52.

The rotation of the shaft 114 in the bore 144 defines the rotational motion about the fourth axis 58.

A pressure pin 152 has one end contoured to conform to the bottom of a groove 154 in the shaft 114 as seen in FIG. 9.

A separable cross piece 158 is mounted into a cross barrel 156 by screws 159 (FIG. 8) and has an internal bore 160 within which is contained a spring 162 which is seated on a pin shoulder 164 (FIG. 9). Assembly of the separable cross piece 158 onto cross barrel 156 compresses the spring 162 to force the pin 152 into frictional engagement with the shaft 114 at the bottom of the groove 154.

A disc 166 inserted within bore 160 engages the upper end of the spring 162. A screw 168 threaded into a thread upper portion of bore 160 engages the disc 166 and may be advanced to further compress the spring 162 and increase the friction generated using a coin in a slot 170.

FIG. 10 shows the capability of adjusting the position of the platform 54 which shows an electronic display device 172 being held thereon to maintain an orientation with respect to the user while being shifted in its position. The platform 54 can be selectively positioned in many locations and orientations such as to a stowed position to one side over the table 12, as seen in FIG. 10.

The invention claimed is:

1. A support arrangement for positioning a generally planar platform in a range of locations and orientations, comprising:
   a standard having an associated mounting adapted to fix said standard in an upright orientation with respect to a horizontal structure to be held thereby;
   a first swing arm extending generally horizontally from said standard and having an inner end connected to said upright standard allowing rotation thereof about a first generally vertical axis, said first swing arm having an outer end having a pivotal connection to an inner end of a second swing arm extending out generally horizontally from said first swing arm and able to swing about a second generally vertical axis defined by said pivotal connection so as to allow said second swing arm to be able to swing from said outer end of said first swing arm;
   an outer end of said second swing arm connected to a first fitting projecting generally horizontally away from said second swing arm outer end and having a pivotal connection to a second fitting to allow swinging of said second fitting about a generally vertical third axis defined by said pivotal connection to said first fitting;
   said second fitting having a shaft portion extending radially from said third axis away from said pivotal connection to said first fitting and received in a bore in a platform holder so that said platform holder is rotatable thereon about a fourth axis defined by an axis of rotation of said platform holder on said shaft portion which intersects said third axis, said platform holder able to be pivoted by rotation of on said second fitting shaft portion;
   said platform holder having a front side held against a central region of a back side of said platform by a pivotal connection therebetween so as to allow said platform to be rotated on said platform holder about a fifth axis extending generally perpendicularly into said platform;
   whereby said platform is variably positionable relative said horizontal structure by substantially independent pivoting of said platform about said first, second, third, fourth and fifth axes.

2. The support according to claim 1 wherein at least one of said pivotal connections includes a arrangement so as to hold said platform in any positioning set by a user.

3. The support according to claim 2 wherein said friction retarding arrangement includes a threaded element engaged in a threaded bore in one part of said pivotal connections and having a head received in a friction element to be engaged therewith to enable a tightening thereof to adjust a pressure exerted by engagement of said friction element on said one part by tightening of said threaded element to create an adjustable frictional retardation of said relative pivotal movement, with said pivoting movement thereby not tending to loosen said threaded element.

4. The support according to claim 2 wherein said second fitting shaft portion has a groove formed therein and wherein a pin is held urged into engagement against a surface of said groove to act to hold said second fitting shaft portion in said bore and to frictionally retard rotation of said platform holder on said shaft portion.

5. The support according to claim 3 wherein said friction retarding arrangement comprises a circular piece received in a bore in another part of said at least one pivotal connection, and having key features received in slots formed in said one part to be rotationally fixed thereto, said pin having a flange engaging a shoulder in said bore to thereby establish frictional engagement with said another part.

\* \* \* \* \*

UNITED STATES PATENT AND TRADEMARK OFFICE
CERTIFICATE OF CORRECTION

PATENT NO.         : 9,140,406 B2                                     Page 1 of 1
APPLICATION NO.    : 13/934710
DATED              : September 22, 2015
INVENTOR(S)        : David F. Simon It is certified that error appears in the above-identified patent and that said Letters Patent is hereby corrected as shown below:

In The Specification

Column 6, line 10 delete "of".

Signed and Sealed this
Fifth Day of January, 2016

Michelle K. Lee
*Director of the United States Patent and Trademark Office*